US012203696B2

(12) United States Patent
Akalan et al.

(10) Patent No.: US 12,203,696 B2
(45) Date of Patent: Jan. 21, 2025

(54) HOME APPLIANCE HAVING A HOUSING CONNECTION ARRANGEMENT

(71) Applicant: BSH Hausgeräte GmbH, Munich (DE)

(72) Inventors: Yigit Akalan, Tekirdag (TR); Arif Dogan, Gaziantep (TR); Cemalettin Hasturk, Knoxville, TN (US); Erhan Kaya, Tekirdag (TR); Vishal Vekariya, Knoxville, TN (US)

(73) Assignee: BSH Hausgeräte GmbH, Munich (DE)

( * ) Notice: Subject to any disclaimer, the term of this patent is extended or adjusted under 35 U.S.C. 154(b) by 53 days.

(21) Appl. No.: 17/926,707

(22) PCT Filed: May 17, 2021

(86) PCT No.: PCT/EP2021/063006
§ 371 (c)(1),
(2) Date: Nov. 21, 2022

(87) PCT Pub. No.: WO2021/233832
PCT Pub. Date: Nov. 25, 2021

(65) Prior Publication Data

US 2023/0194152 A1 Jun. 22, 2023

(30) Foreign Application Priority Data

May 22, 2020 (TR) ................................ 2020/07983

(51) Int. Cl.

| | |
|---|---|
| ***F23D 23/00*** | (2006.01) |
| ***A47B 47/02*** | (2006.01) |
| ***F25D 23/06*** | (2006.01) |
| *F25D 23/00* | (2006.01) |

(52) U.S. Cl.
CPC ............ *F25D 23/062* (2013.01); *A47B 47/02* (2013.01); *F25D 23/063* (2013.01); *E05Y 2900/31* (2013.01); *F25D 23/006* (2013.01)

(58) Field of Classification Search
CPC ............................ A47B 47/02; E05Y 2900/31
See application file for complete search history.

(56) References Cited

U.S. PATENT DOCUMENTS

| | | | | |
|---|---|---|---|---|
| 3,157,306 | A | 11/1964 | Courson | |
| 8,113,604 | B2 * | 2/2012 | Olson | F25D 23/062 312/265.5 |
| 9,285,157 | B2 * | 3/2016 | Selin | F25D 19/00 |
| 10,697,692 | B2 * | 6/2020 | Akalan | F25D 23/028 |

(Continued)

FOREIGN PATENT DOCUMENTS

| | | | |
|---|---|---|---|
| CN | 208186780 | U | 12/2018 |
| WO | 9006479 | A1 | 6/1990 |

(Continued)

*Primary Examiner* — Kimberley S Wright
(74) *Attorney, Agent, or Firm* — Laurence A. Greenberg; Werner H. Stemer; Ralph E. Locher

(57) ABSTRACT

A home appliance has a housing with at least one first side panel and at least one second side panel. The second side panel is adjacent the relevant first side panel of the housing, and connects to the first side panel by way of at least one housing connection arrangement. The housing connection arrangements are provided in such a way that the first side panel has at least one connection recess for receiving a corresponding panel connection detail of the second side panel.

11 Claims, 5 Drawing Sheets

(56) References Cited

U.S. PATENT DOCUMENTS

| | | | | |
|---|---|---|---|---|
| 10,724,783 | B2 * | 7/2020 | Ertik | F25D 23/028 |
| 10,921,047 | B2 * | 2/2021 | Kilinc | F25D 11/02 |
| 11,156,396 | B2 * | 10/2021 | Gochika | F25D 23/062 |
| 11,168,935 | B2 * | 11/2021 | Wong | F25D 23/006 |
| 11,578,908 | B2 * | 2/2023 | Gochika | F25D 23/025 |
| 2008/0284302 | A1 * | 11/2008 | Olson | F25D 23/062<br>312/265.5 |
| 2009/0057527 | A1 * | 3/2009 | Jo | D06F 39/125<br>248/639 |
| 2011/0126571 | A1 * | 6/2011 | Selin | F25D 19/00<br>62/449 |
| 2011/0146336 | A1 * | 6/2011 | Selin | F25D 23/063<br>62/449 |
| 2011/0179817 | A1 * | 7/2011 | Andersson | F25D 19/00<br>62/288 |
| 2016/0320119 | A1 * | 11/2016 | Ertik | F25D 23/028 |
| 2018/0149405 | A1 * | 5/2018 | Kilinc | F25B 13/00 |
| 2018/0149407 | A1 * | 5/2018 | Akalan | F25D 23/003 |
| 2021/0140703 | A1 * | 5/2021 | Wong | F25D 23/06 |
| 2021/0199366 | A1 * | 7/2021 | Gochika | F25D 23/006 |
| 2022/0003485 | A1 * | 1/2022 | Gochika | F25D 23/003 |
| 2023/0194145 | A1 * | 6/2023 | Gochika | F25D 23/006<br>312/404 |

FOREIGN PATENT DOCUMENTS

| | | | |
|---|---|---|---|
| WO | 2009141127 | A2 | 11/2009 |
| WO | 2018164591 | A1 | 9/2018 |

* cited by examiner

HOME APPLIANCE HAVING A HOUSING CONNECTION ARRANGEMENT

FIELD AND BACKGROUND OF THE INVENTION

The present invention relates to a home appliance with a housing having at least one first side panel and at least one second side panel, which is adjacent to the relevant first side panel of the housing, and connects to the first side panel by way of at least one housing connection arrangement.

The document numbered CN208186780U provides an assembly structure for air condensing units front bezel and curb plate, including preceding plate structure and side plate structure, preceding plate structure include the front panel, link to each other with the side of front panel crooked is connected the face, with crooked is connected that the face is connected and with the first connecting plate of front panel looks vertically, face one end bending type one-tenth first hem parallel with the front panel towards the front panel on one side of is connected to the keeping away from of first connecting plate, first hem keep away from first connecting plate one end towards a plurality of checkposts of curb plate orientation bending type one-tenth, side plate structure includes the curb plate, be located the second hem keeps away from the third hem that curb plate one end and the preceding panel orientation bending type of orientation become and sets up at second hem top and checkpost assorted draw-in groove. The fineness is also being accomplished in appearance to effectual troublesome poeration and the waste cost problem of using the screw fixation avoided of the mutual joint of checkpost and draw-in groove, has reached the problem that makes things convenient for operation, reduce cost, assurance assembly precision.

The invention provides an additional improvement, an additional advantage or an alternative to the prior art.

BRIEF DESCRIPTION OF THE INVENTION

An object of the invention is to provide easy assembling of the side panels of the home appliance and easy centering of the same to each other during the assembly process.

In order to achieve the objects, the invention is a home appliance comprising: a housing having at least one first side panel, and at least one second side panel which is adjacent to the relevant first side panel of the housing, and connects to the first side panel by way of at least one housing connection arrangement. In the invention, the housing connection arrangements are provided in such a way that the first side panel has at least one connection recess for receiving a corresponding panel connection detail of the second side panel. Thus, the first side panel and the second side panel connects to each other in an easily manner.

Besides, centering of the side panels to each other is achieved in an easily manner.

Therefore, during the assembly process, possible misalignments between the side panels are prevented.

Here, the home appliance can be any kind of domestic appliance such as a refrigerator, an oven, a washing machine.

Here, the first side panel is being a side panel of the housing of the home appliance.

Here, the second side panel is being an aggregate side panel, in other words a side panel of a machine room of the home appliance.

In a possible embodiment of the invention, the first side panel has two connection recesses, and the second side panel has two panel connection details corresponding the connection recesses. Thus, the first side panel durably associates with the second side panel.

In a possible embodiment of the invention, the panel connection details are configured to extend in a direction parallel to the first side panel. Thus, a connection surface is provided on the second side panel in order to be connected to the first side panel.

In a possible embodiment of the invention, both the first side panel and the second side panel are made from a metallic material. Thus, the side panels are formed for easy assembling.

In a possible embodiment of the invention, the second side panel with the panel connection details is being a single-piece unitary component. Thus, number of assembly sub-parts reduce and therefore further assembly steps are eliminated.

In a possible embodiment of the invention, the second side panel comprises a top wall extending towards the housing and wherein the panel connection details are being formed from the top wall. Thus, the number of assembly sub-parts reduce and therefore further assembly steps are eliminated.

In a possible embodiment of the invention, the connection recesses are formed as a deepening on a side surface of the first side panel facing outside. Thus, connection recesses receive the corresponding panel connection details. For example, built-in type refrigerators are mounted inside of the kitchen niche. While installing said home appliances inside of the niche, panel connection details of the second side panels do not touch side walls of the niche due to the connection recesses.

In a possible embodiment of the invention, the connection recesses have a three-sided periphery wall. Thus, the connection recesses guide the corresponding panel connection details in assembly process.

In a possible embodiment of the invention, the connection recesses have an unwalled side provided on a side facing the second side panel. Thus, the connection recesses guide the corresponding panel connection details in assembly process.

In a possible embodiment of the invention, the connection between the first side panel and the second side panel is provided by only at least one connection element passing through the side panels in a direction perpendicular to the side panels. Thus, number of assembly sub-parts reduce and therefore further assembly steps are eliminated. Furthermore, the side panels assemble more rigidly and ergonomically.

In a possible embodiment of the invention, the connection recesses have a connection hole, the panel connection details have a corresponding connection hole, and the connection elements pass through the relative connection hole and the corresponding connection hole.

Thus, the side panels are ergonomically assembled to each other.

Here, the connection element can be any kind of element that provides a connection such as a screw, a bolt.

In a possible embodiment of the invention, a pair of first side panels are provided on opposite sides of the housing. Thus, assembly process of the side panels at the opposite sides of the housing are provided as the same.

In a possible embodiment of the invention, the second side panel has a front wall facing outside and being between the first side panel and a base where the home appliance stands, when the side panels connected to each other.

In a possible embodiment of the invention, the home appliance is being a cooling device, in particular a refrigerator comprising a housing.

In this context, with the indications "top", "bottom", "front", "rear", "horizontal", "vertical", "upward", "downward", "inner", "outer", "inward", "outward" etc. the positions and orientations given for intended use and intended arrangement of the cooling device and for a user then standing in front of the home appliance, in particular cooling device in a closed position and viewing in the direction of the device are indicated.

Each possible embodiment disclosed in this text can be combined with the other possible embodiments disclosed in this text if there is no any technical constraint.

BRIEF DESCRIPTION OF THE FIGURES

The figures, whose brief explanations are herewith provided, are solely intended for providing a better understanding of the present invention and are as such not intended to define the scope of protection or the context in which said scope is to be interpreted in the absence of the description.

DETAILED DESCRIPTION OF THE INVENTION

In this detailed explanation, the invented subject matter is explained with examples in order to make the subject more understandable without forming any restrictive effect. According to this, in the detailed explanation below, the housing connection arrangement (14) is explained to be applied to a cooling device (1) such as a refrigerator. However, the same embodiment can be applied to any kind of home appliances, such as ovens, washing machines.

Figure 1:
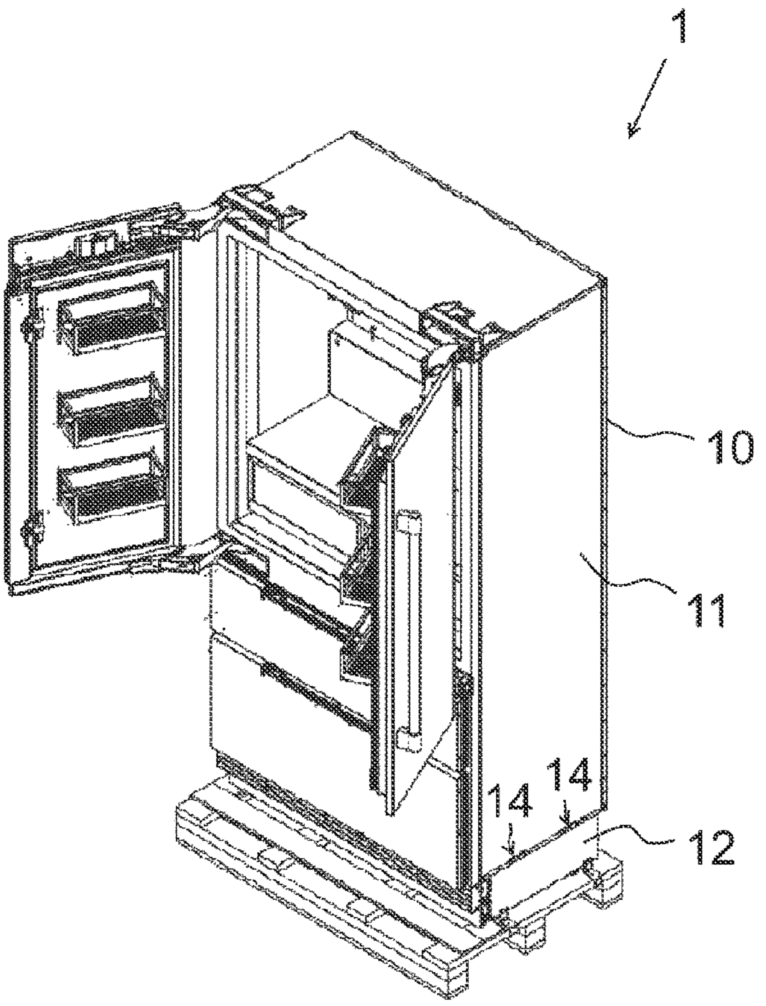
FIG. 1 is an isometric view of the exemplary cooling device that shows the housing connection arrangement.

As shown in the FIG. 1, the exemplary cooling device (1) comprises a housing (10) in which a compartment where victuals can be stored, is embodied. The housing (10) has at least one first side panel (11). In a possible embodiment, a pair of first side panels (11) are provided on opposite sides of the housing (10). Said cooling device (1) further comprises at least one second side panel (12) which is adjacent to the relevant first side panel (11) of the housing (10). The second side panel (12) connects to the first side panel (11) by way of at least one housing connection arrangement (14). In a possible embodiment of the invention, as can be seen in FIG. 3, the housing connection arrangements (14) are provided in such a way that the first side panel (11) has at least one connection recess (111) for receiving a corresponding panel connection detail (121) of the second side panel (12).

Figure 2:
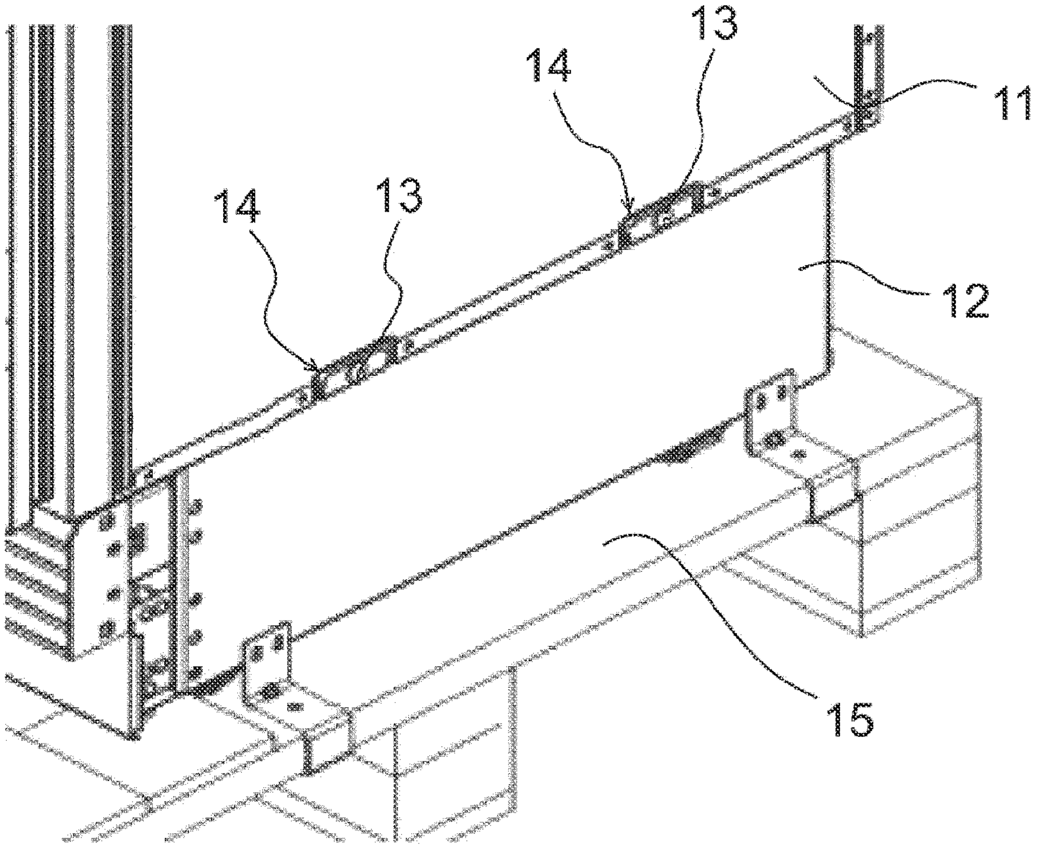
FIG. 2 is a zoomed view of the exemplary cooling device that shows the housing connection arrangement.

With reference to FIG. 2, the second side panel (12) is being between the first side panel (11) and a base (15) where the home appliance stands, when the side panels (11, 12) connected to each other. The second side panel (12) connects to the base (15) from one side and to the first side panel (11) from the other side. In a possible embodiment, the cooling device (1) comprises two housing connection arrangements (14) spaced apart each other in a depth direction of the cooling device (1). In more details, the first side panel (11) has two connection recesses (111) and the second side panel (12) has two panel connection details (121) corresponding the connection recesses (111). The connection between the side panels (11, 12) is achieved by at least one connection element (13) passing through the first side panel (11) and the second side panel (12) in a direction perpendicular to the side panels (11, 12).

Figure 3:
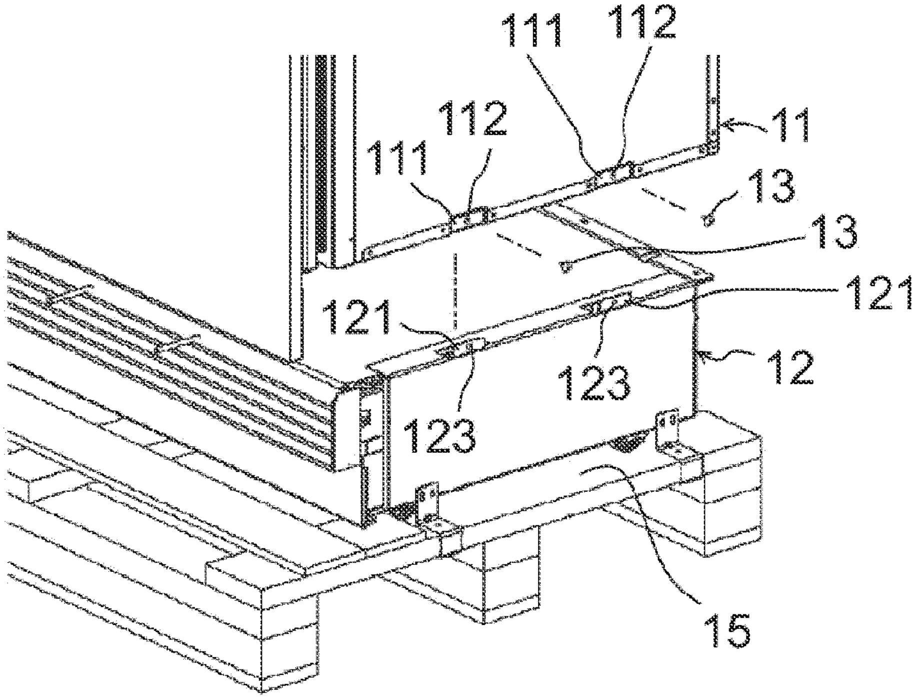
FIG. 3 is an exploded view of the first side panel and the second side panel of the exemplary cooling device.

With reference to FIG. 3, the panel connection details (121) of the second side panel (12) are configured to extend in a direction parallel to the first side panel (11). The panel connection details (121) are shaped and sized according to the connection recesses (111). Said connection recesses (111) of the first side panel (11) have connection holes (112). In more details, each of the connection recess (111) has one or more connection holes (112) in order to connect the first side panel (11) to the second side panel (12) by means of the connection element (13).

Figure 4:
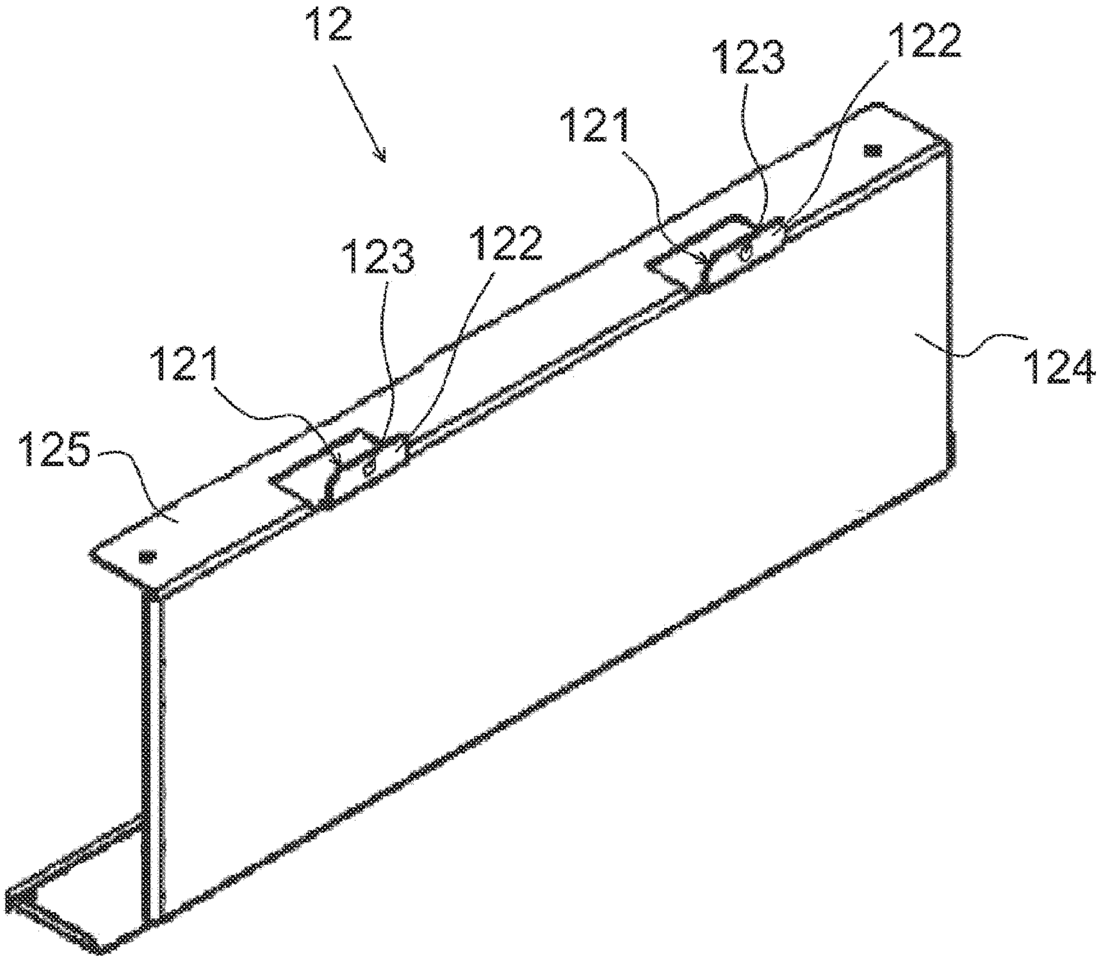
FIG. 4 is an isometric view of the second side panel whereon the panel connection details are provided.

With reference to FIG. 4, the second side panel (12) has a front wall (124) facing outside of the cooling device (1) and a top wall (125) extending towards the housing (10) of the cooling device (1). The top wall (125) is being on a plane perpendicular to the first side panel (11). In a possible embodiment of the invention, the panel connection details (121) are being formed from the top wall (125). In more details, the panel connection details (121) are formed by cutting and bending relevant sections of the top wall (125). The panel connection details (121) have connection surfaces (122) whereon the corresponding connection holes (123) are provided. In a possible embodiment, the second side panel (12) having the panel connection details (121) is being a single-piece unitary component.

Figure 5:
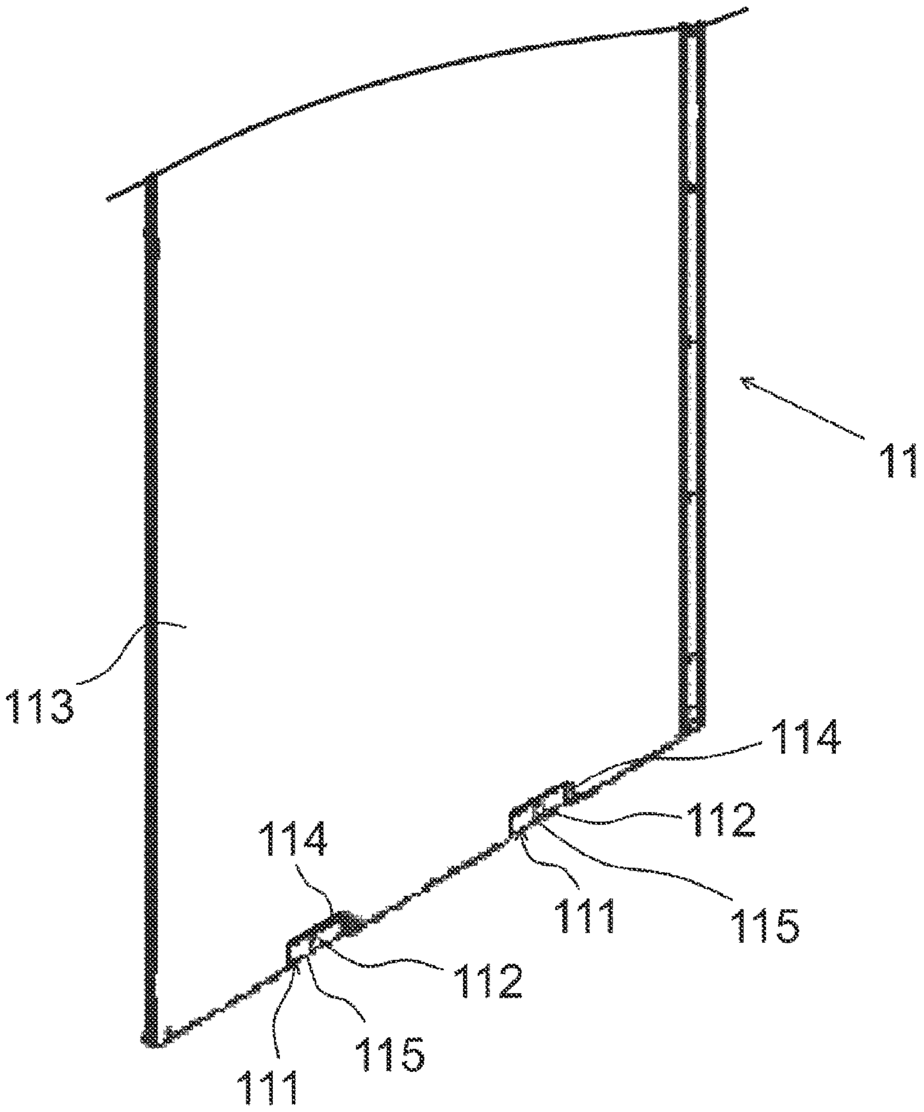
FIG. 5 is an isometric view of the first side panel whereon the connection recesses are provided.

With reference to FIG. 5, the first side panel (11) comprises connection recesses (111) corresponding to the panel connection details (121) of the second side panel (12). Each of the connection recesses (111) has a connection hole (112) and each of the connection hole (112) correspond to the corresponding connection holes (123). Said connection recesses (111) are formed as a deepening on a side surface (113) of the first side panel (11) facing outside. The connection recesses (111) are configured on a bottom region of the side surface (113) of the first side panel (11). Said bottom region is a region close to the second side panel (12). In a possible embodiment of the invention, the connection recesses (111) have a three-sided periphery wall (114). In more details, the connection recesses (111) have an unwalled side (115) provided on a side facing the second side panel (12). In a possible embodiment, the cooling device (1) has a pair of first side panels (11) provided on opposite sides of the housing (10). In the invention, both the first side panel (11) and the second side panel (12) are made from a metallic material.

During the assembly process of the side panels (11, 12), each of the connection recesses (111) of the first side panel (11) receive the corresponding panel connection details (121) of the second side panel (12). The connection recesses (111) receive the corresponding panel connection details (121) with the aid of the unwalled side (115), when the first side panel (11) moved towards the second side panel (12) in the vertical direction. When the connection recesses (111) receive the corresponding panel connection details (121), the connection hole (112) correspond to the corresponding connection hole (123). Then, the each relevant panel connection details (121) and connection recesses (111) are connected to each other by means of connection elements (13) such as screws. In a possible embodiment, the connection between the first side panel (11) and the second side panel (12) is provided by only at least one connection element (13) passing through the side panels (11, 12) in a direction perpendicular to the side panels (11, 12). Thus, the first side panel and the second side panel connects to each other in an easily manner. Besides, centering of the side panels to each other is achieved in an easily manner.

REFERENCE LIST

1 Cooling device
  10 Housing
  11 First side panel
    111 Connection recess
    112 Connection hole
    113 Side surface
    114. Three-sided periphery wall
    115. Unwalled side
  12 Second side panel
    121 Panel connection detail
    122 Connection surface
    123 Corresponding connection hole
    124 Front wall
    125 Top wall
13 Connection element
14 Housing connection arrangement
15 Base

The invention claimed is:

1. A home appliance, comprising:
a housing having at least one first side panel and at least one second side panel adjacent said at least one first side panel, and each of said first side panel and said second side panel being made from a metallic material;
a housing connection arrangement for connecting said second side panel of said housing to said first side panel of said housing;
said housing connection arrangement including a panel connection detail on said second side panel, said second side panel with said panel connection detail being a single-piece unitary component, and a connection recess formed on said first side panel for receiving said panel connection detail of said second side panel; and
said second side panel having a top wall extending towards said housing, said panel connection detail being formed from said top wall by cutting and bending at least sections of said top wall, said top wall having a cut-out corresponding to said connection detail, and said connection recess being a deepened impression on a side surface of said first side panel facing outward.

2. The home appliance according to claim 1, wherein said first side panel has two connection recesses formed therein and said second side panel has two panel connection details respectively corresponding said two connection recesses.

3. The home appliance according to claim 2, wherein said panel connection details are configured to extend in a direction parallel to said first side panel.

4. The home appliance according to claim 1, wherein said connection recess has a three-sided periphery wall.

5. The home appliance according to claim 4, wherein said connection recess have an unwalled side provided on a side facing toward said second side panel.

6. The home appliance according to claim 1, wherein a connection between said first side panel and said second side panel is provided by only at least one connection element passing through said first and second side panels in a direction perpendicular to said first and second side panels.

7. The home appliance according to claim 6, wherein said connection recess is formed with a connection hole, wherein said panel connection detail is formed with a corresponding connection hole and wherein said at least one connection element passes through said connection hole in said connection recess and through said connection hole in said connection detail.

8. The home appliance according to claim 1, wherein said at least one first side panel is one of a pair of first side panels provided on opposite sides of said housing.

9. The home appliance according to claim 1, wherein said second side panel has a front wall facing outward and being disposed between said first side panel and a base upon which the home appliance stands, when said first and second side panels are connected to each other.

10. The home appliance according to claim 1, configured as a cooling device.

11. A refrigerator, comprising a housing according to claim 1.

* * * * *